United States Patent Office 2,929,247
Patented Mar. 22, 1960

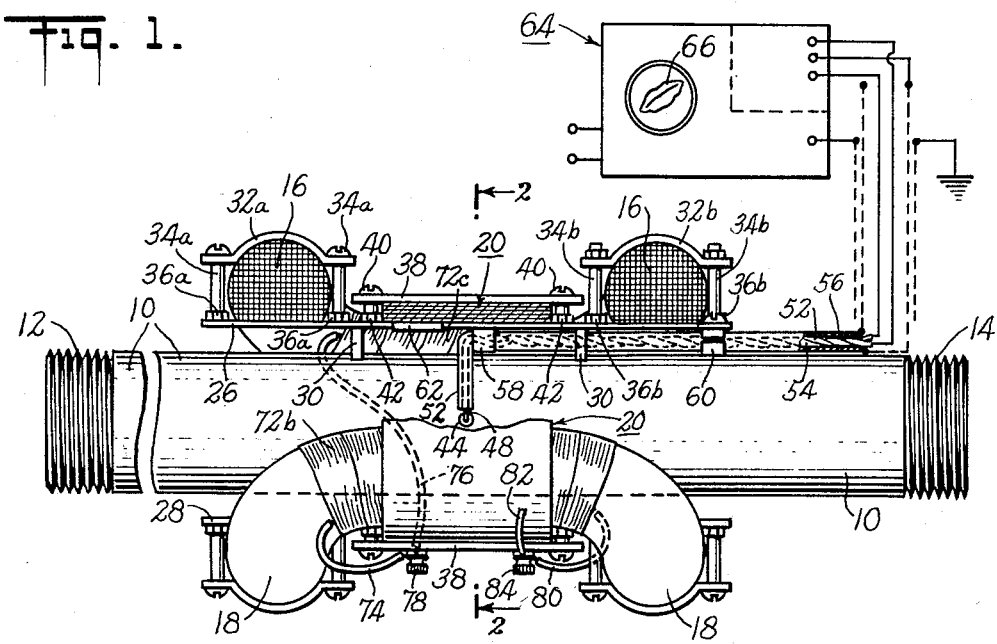

2,929,247

METHOD OF AND APPARATUS FOR MINIMIZING SPURIOUS SIGNALS IN AN ELECTROMAGNETIC FLOWMETER

Stocker S. Sturgeon, Foxboro, Mass., assignor to The Foxboro Company, Foxboro, Mass., a corporation of Massachusetts Application September 6, 1956, Serial No. 608,352

8 Claims. (Cl. 73—194)

This invention relates to electromagnetic flowmeters. More in particular, this invention relates to methods and means for substantially eliminating certain spurious electrical signals developed in such a flowmeter.

As is now well known, electromagnetic flowmeters have a number of desirable characteristics which make them particularly suitable for many industrial applications. Such flowmeters include a flowmeter head typically comprising a metallic pipe section to be coupled into the fluid flow system under measurement, a coil structure for producing an alternating magnetic field transversely through this pipe section, and a pair of electrodes in contact with the fluid flowing through the pipe section and positioned in the interior of the pipe so as to sense the electrical potential generated by the flowing of the fluid across the magnetic lines of force. The potential sensed by these electrodes commonly is coupled through a pair of lead wires to an amplifier the output of which controls one or more of a variety of recording or flow controlling devices.

Because the electrical potentials generated by a fluid flowing through a magnetic field are, as a practical matter, very small in magnitude relative to the level of signals encountered in most electrical equipment, the presence of spurious signals of nominally small amplitude in the output lead wires can produce substantial errors in flow measurement. Such spurious signals may come from a variety of sources, e.g. inductive or capacitive pick-up from neighboring electrical circuits. One outstanding reason for the presence of spurious signals stems from the fact that the lead wires connected to the contact electrodes form a closed loop (since the fluid will be somewhat conductive), and any change in magnetic flux through this loop of course produces an electrical signal which is transmitted to the flow indicating or controlling equipment along with the main flow measurement signal sensed by the electrodes. Because of this, it has previously been recognized that special provisions must be made to assure minimum coupling between the field coils and the closed loop formed by the lead wires; see U.S. patent application Serial No. 455,923, filed on September 14, 1954, by Stocker S. Sturgeon et al., now Patent No. 2,867,119.

Although the arrangement described in the above-mentioned copending application provides a satisfactory solution to the problem of minimizing direct coupling between the field coils and the closed loop formed by the lead wires, it has been found that there remain other sources of spurious signals which are not obviated by means employed heretofore. Particular difficulty has been encountered in some installations with certain spurious signals having components which are in phase with the main flow signal sensed by the contact electrodes. These spurious signals, which appear to stem at least partly from inductive pick-up, do not result from direct coupling to the field coils since the spurious signals produced by such direct coupling are 90 degrees out of phase with the main flow signal. Although the exact theoretical explanation for these spurious signals having "in-phase" components is perhaps not fully clear, it now is believed that they result largely from eddy-currents flowing in metal parts of the flowmeter head structure.

Accordingly, it is an object of this invention to provide an electromagnetic flowmeter that is superior to such flowmeters proposed heretofore. It is a further object of this invention to provide a method of and apparatus for substantially eliminating certain types of spurious electrical signals present in the output lead wires of an electromagnetic flowmeter head and having substantial components in phase with the main flow signal.

In an embodiment of the invention to be described in detail hereinbelow, a flowmeter head of known construction is provided having contact electrodes mounted on opposite sides of a section of metal pipe and a pair of lead wires extending from these electrodes circumferentially around the pipe to a region midway between the electrodes. From this region the wires also extend longitudinally along the pipe for connection to a suitable amplifier. A pair of alternating-current field coils, mounted on opposite sides of the pipe, are surrounded by a band of magnetic material which serves as a low reluctance return path for the magnetic flux developed by these coils; both the band and the coils are secured to the pipe section by means of a pair of longitudinally-extending bridges welded in place on opposite sides of the pipe.

To minimize the spurious signals in the lead wires, there is secured to the inner side of the band of magnetic material a small plate of aluminum. The exact position of this plate is established individually for each flowmeter head by a testing procedure which comprises observing the output signal of the flowmeter head on a suitable indicator while manually shifting the plate into various locations, and then selecting that location which substantially eliminates the spurious signal present on the output lead wires as shown on the indicator. Following the establishment of this precise location, the aluminum plate is permanently fixed in position adjacent the magnetic band.

Other objects, aspects and advantages of the present invention will be apparent from, or pointed out in, the following description considered together with the accompanying drawings, in which:

Figure 1 is a side elevation view of an electromagnetic flowmeter head, partially broken away to show the placement of the aluminum plate;

Figure 2 is a cross sectional view of the flowmeter head, taken along lines 2—2 of Figure 1;

Figure 3 is a detail view showing the arrangement for holding the aluminum plate in position; and Figure 4 is a detail view, somewhat exaggerated for emphasis, showing the layer of insulation between adjoining sections of the magnetic band.

Referring now to Figure 1, the fluid whose flow rate it is desired to measure passes through a section of stainless steel pipe 10, the opposite ends 12 and 14 of which are threaded so that the pipe may readily be coupled into an operating flow system (not shown.) The interior wall of the pipe normally is provided with an insulating liner 15, advantageously formed by baking a vitreous enamel directly on the pipe inner wall, or by coating the interior with a thin layer of chemical and heat-resistant plastic.

Positioned around the pipe 10, and approximately centrally disposed between the two ends thereof, is a magnetic flux producing structure consisting of an upper coil 16 and a lower coil 18. These two coils are identical as to shape, number of turns, size of wire, etc., and are energized by a source of alternating current (not shown), for example the usual line source of 110 volts and having a frequency of 60 cycles per second. The coils are positioned symmetrically with respect to the pipe axis and their respective lead-in wires (not shown) are connected in parallel with the source of alternating current. The magnetic fields produced by the coils are additive, i.e. the coils are energized in phase with each other, so that when the flux produced by one coil in the center thereof is directed upwardly, the flux produced by the other coil in the center thereof also is directed upwardly, and vice versa.

Surrounding the two coils 16 and 18 is a laminated band 20 (see Figure 2), formed of a long continuous sheet of silicon steel wound in close spiral fashion, and serving as a split return path of low reluctance for the flux passing through the pipe 10. That is, flux passing downwardly through the pipe divides into two components when it reaches the lower horizontal portion of the band, the two components traveling horizontally outwards away from the center of the pipe, up the vertical sides of the band, and inwardly along the upper horizontal band portion in the center of which they combine again and turn downwardly through the pipe to complete the path.

It has been found important in achieving freedom from spurious signals to assure that the adjoining sections of band laminations are well insulated electrically from one another. Of course, the individual laminations of any conventional magnetic core are nominally intended to be insulated, but experience has shown that such conventional arrangements do not provide adequate isolation, e.g. small burrs or similar protrusions on one section of laminate frequently will pierce the insulating film on the adjoining section and produce conductive paths between the two. Such paths, although they are normally not of significance in the usual application, make possible the flow of eddy-currents which investigation now indicates can be injurious to the operation of an electromagnetic flowmeter. It has been suggested that the undesirable effects may be avoided by winding a "shorted turn" of wire around the magnetic band, so as to surround the flux passing therethrough; although this approach has proven beneficial in some respects, it has not been wholly successful.

To eliminate the effects of these eddy-currents, in accordance with one aspect of the present invention the band 20 is formed between adjoining sections thereof with a layer of insulation that is thicker than the height of any protuberances, e.g. burrs, extending out from either of these sections in a direction normal to the surface. Thus, the laminations are held spaced apart a sufficient distance to positively prevent electrical contact therebetween. As shown in Figure 4, which is a detail cutaway of the band with relative dimensions somewhat exaggerated for purposes of illustration, this insulation layer comprises two strips 22 of "glass" tape (a glass fiber material) secured to one face of the sheet of silicon steel 20a adjacent the respective edges thereof and parallel to the long dimension of the sheet. Between these tapes is a film of insulating cement 24 which is spread evenly over the metal sheet to a thickness approximately equal to the thickness of the tapes 22. This cement preferably is a resinous compound, for example a mixture of the preparations known commercially as Scotch-Cast #3 and Armstrong Cement Type A2. The insulation layer should provide sufficient separation and isolation between adjoining sections that the ohmic resistance measured between the inner and outer turns of the assembled band is substantially equal (within 1%) to the ohmic resistance of the unwound steel sheet 20a when measured from end-to-end.

Reverting to Figure 1, the coils 16 and 18 and the band 20 are supported by parallel bridge members 26 and 28 extending longitudinally of the pipe 10 on opposite sides thereof. These bridges are identical, and are secured to the pipe by arch members 30 which are welded to both the pipe and the corresponding bridge. Since the upper and lower coil and band support structures are similar, the details of the upper support only will be described.

In the two places where the coil 16 passes transversely over the top of the pipe 10, it is fastened in position by curved clamps 32a, and 32b which are shaped to fit snugly over the outer surfaces of the coil. Each of these clamps is secured to the bridge 26 by bolts 34a and 34b threadedly engaged with corresponding holes extending through the bridge, the bolts being locked into position by nuts 36a and 36b. Similarly, the band 20 is held in position, where it passes over the top of the pipe 10, by a flat plate 38 which is fastened to the bridge 26 by two bolts 40 threaded into holes in the bridge and locked in place by nuts 42.

As shown in Figure 2, the flowmeter head includes a pair of electrodes 44 and 46 extending through corresponding openings in the pipe wall on opposite sides thereof. These electrodes are electrically insulated from the pipe, and make contact with the fluid flowing through the pipe. Connected to these electrodes respectively are insulated output lead wires 48 and 50 which extend upwards through copper shield tubes 52 and 54 joined together at the top of the pipe to form a "saddle" fitted around the pipe in a plane perpendicular to the pipe axis.

These shield tubes 52 and 54 extend to the right (Figure 1) along the top of the pipe 10, and are twisted together to increase their structural rigidity as well as to reduce inductive pick-up from the flowmeter coils and other neighboring electrical circuits. This horizontal portion of the shield tubes also is encased in an insulating sheath 56 formed of a fiber-glass silicon composition. The shield tubes pass through and are supported by an apertured member 58 which is secured to the underside of the bridge member 26, and also are supported by a clamping device 60 adjacent the right-hand end of the bridge member. As described in detail in the above mentioned co-pending application, the shield tubes including the saddle portion are adjusted longitudinally to that position which produces minimum direct coupling between the field coils 16 and 18 and the closed loop formed by the lead wires 48 and 50 extending circumferentially around the pipe.

When the lead wires 48 and 50 have thus been positioned to produce minimum direct coupling with the field coils 16 and 18, there still remains in these lead wires spurious signals of small magnitude and having components that are in phase with the main flow signal sensed by the electrodes 44 and 46. In accordance with another aspect of the present invention, these spurious signals are substantially eliminated by placing a small plate 62 of aluminum adjacent the inner surface of the magnetic band 20. The placement of this plate is determined in accordance with the method now to be described.

With the flowmeter field coils 16 and 18 energized, and the output lead wires 48 and 50 connected to an indicating device generally illustrated in block form at 64 (and which may include suitable amplification means), the residual output signal on the lead wires is determined by observation. It has been found that a conventional oscilloscope serves particularly well as an indicator for this purpose, with the flowmeter output connected to one set of deflection plates and the other set of deflection plates energized by the power voltage supplied to the flowmeter field coils. When the residual signal includes components that are in phase with the A.-C. power signal, the oscilloscope will trace out a pattern encompassing a substantial area, such as shown generally at 66 in Figure 1. To eliminate this in-phase spurious signal, the aluminum plate 62 is manually moved into position within the interior of the band 20 and shifted through various locations immediately adjacent the inner surface of this band until the oscilloscope pattern is as nearly a straight line as can be obtained. When this condition has been achieved, the in-phase components of residual signal have been essentially eliminated from the flowmeter head output lead wires.

Although the size of the aluminum plate 62 is not particularly critical, experience has shown that a rectangular plate approximately 2" x 3" x 1/16" will serve satisfactorily in most applications for flowmeter pipe sizes above 2" in diameter. After the optimum location has been determined by the method outlined above, other sizes of plates advantageously may be tried in that location to determine whether any further refinement can be achieved.

An exact theoretical explanation for the phenomena outlined above is not clearly established at this time. However, it now seems likely that the spurious signals having in-phase components result from the flow of eddy-currents in regions which are non-symmetrical with respect to the flowmeter leads 48 and 50. Such eddy-currents would be induced by the alternating flux produced by the field coils 16 and 18 and, because of the substantial resistive component in the path of such eddy-current flow, the counter flux developed by the eddy-currents would be out of phase with the principal flux developed by the field coils.

For example, if an eddy-current were established in the bridge member 26, to the right of the electrodes 44 and 46 (referring to Figure 1), without a corresponding eddy-current being established in the bridge member to the left of these electrodes, a portion of the flux produced by this eddy-current would pass through the closed loop formed by the electrode leads 48 and 50 extending around the pipe 10, provided the effective plane of the eddy-current path was other than perpendicular to the plane of the closed loop as it very likely would be. In that event, there would be induced in the closed loop of the electrode leads a spurious signal having a component in phase with the main flow signal sensed by the electrodes. It is believed probable that the conductive aluminum plate 62 produces additional eddy-current flux of proper phase and amplitude to oppose the flux produced by non-symmetrical eddy-current paths in the flowmeter head structure. Thus, there is essentially no change in flux through the lead-wire loop, and hence substantially all of the inductively-produced spurious signals in the electrode leads are eliminated.

After the best position for the aluminum plate 62 has been established, it is fixed in this position by taping it to the band 20. For this purpose, referring now to Figure 3, the plate first is wrapped with several layers of conventional adhesive tape 68 with the adhesive film facing outside. The wrapped plate then is pressed against the inner surface of the band in the location determined by the method outlined above, and is secured there by additional layers 70 of adhesive tape wound around both the block and the band.

It also has been found advantageous, in eliminating spurious signals as outlined above, to wrap the field coils 16 and 18 in a sheath of aluminum, at least in the region adjacent the closed loop of the lead wires 48 and 50. As shown in Figure 2, four identical sheaths 72a, 72b, 72c, 72d are provided, two for each of the coils. Sheaths 72b and 72c are connected respectively by wires 74 and 76 to a terminal 78 conductively secured to the flat support plate 38 (Figure 1), and the sheaths 72a and 72d are connected respectively by wires 80 and 82 to a second terminal 84 also conductively secured to the support plate. Both of these terminals are symmetrically positioned with respect to the contact electrodes 44 and 46. The conductive sheaths 72 serve particularly to shield the lead wires 48 and 50 from the effects of electrostatic potential variations on the field coils, and thereby simplify and improve the procedure outlined above for minimizing spurious signals in the flowmeter head.

Although a specific preferred embodiment of the invention has been set forth in detail, it is desired to emphasize that this is not intended to be exhaustive or necessarily limitative; on the contrary, the showing herein is for the purpose of illustrating one form of the invention and thus to enable others skilled in the art to adapt the invention in such ways as meet the requirements of particular applications, it being understood that various modifications may be made without departing from the scope of the invention as limited by the prior art.

I claim:

1. An electromagnetic flowmeter head arranged to minimize the development of spurious signals in the output thereof and comprising, in combination, a section of pipe adapted to carry flowing fluid, coil means disposed externally of said pipe section and connectible to a source of alternating current to produce an alternating magnetic field across said pipe transverse to the direction of fluid flow, a band of magnetic material surrounding said coil means and said pipe to provide a low-reluctance path for flux produced by said coil means, said band comprising a long continuous sheet of thin magnetic material wound in close spiral fashion, a layer of insulation positioned between adjacent sections of said strip of magnetic material, said layer comprising at least one strip of insulating tape having a width substantially less than the width of said sheet of magnetic material and a film of insulating material disposed along the side of said insulating tape, the thickness of said insulation being greater than the height of any conductive protuberances extending out from the surface of said strip so as to assure that there is no electrical connection established directly between said adjacent sections, a pair of electrically-conductive electrodes within said pipe section on opposite sides thereof to make contact with said fluid, and a pair of lead wires each connected to a respective one of said electrodes and extending away therefrom for connection to electrical sensing means.

2. An electromagnetic flowmeter head arranged to minimize the development of spurious signals in the output thereof and comprising, in combination, a section of pipe adapted to carry flowing fluid, coil means disposed externally of said pipe section and connectible to a source of alternating current to produce an alternating magnetic field across said pipe transverse to the direction of fluid flow, a band of magnetic material surrounding said coil means and said pipe to provide a low-reluctance path for flux produced by said coil means, said band comprising a long continuous sheet of thin magnetic material wound in close spiral fashion, a layer of insulation positioned between adjacent sections of said strip of magnetic material, said layer including two strips of insulating tape each positioned adjacent a respective edge of said sheet and a film of insulating material spread smoothly between said strips and between said adjoining sections, a pair of electrically-conductive electrodes within said pipe section on opposite sides thereof to make contact with said fluid, and a pair of lead wires each connected to a respective one of said electrodes and extending away therefrom for connection to electrical sensing means.

3. The method of zeroizing an electromagnetic flowmeter head of the type which includes a field coil for producing alternating magnetic flux across a section of pipe and a pair of electrodes having lead wires attached thereto to make electrical connection with fluid in the pipe, comprising the steps of: energizing the flowmeter field coil with alternating current, introducing a mass of conductive material into the magnetic field produced by said field coil, measuring the spurious signals appearing in the electrode lead wires, moving said mass through various positions within said magnetic field until a particular position has been reached where said spurious signals have been reduced to a desired low level, and securing said mass in said particular position.

4. The method of zeroizing an electromagnetic flowmeter head of the type which includes a field coil for producing alternating magnetic flux across a section of pipe and a pair of electrodes having lead wires attached thereto to make electrical connection with fluid in the pipe, comprising the steps of: energizing the flowmeter field coil from a source of alternating current, introducing a mass of conductive material into the magnetic field produced by said field coil, measuring the spurious signals appearing in the electrode lead wires by means of an oscilloscope having one set of input terminals coupled to said lead wires and a second set of input terminals coupled to said source of alternating current, moving said mass through various positions within said magnetic field until a particular position has been reached where said spurious signals have been reduced to a desired low level, and securing said mass in said particular position.

5. In magnetic flowmeter apparatus of the type wherein the principal operating parts consist of a section of metallic pipe adapted to carry a flowing fluid and having a non-conductive liner, coil means adjacent said pipe section to produce an alternating magnetic flux in the fluid therein, measuring circuit means including a pair of electrodes at said pipe section to make contact with the fluid for developing an A.-C. output voltage proportional to the flow rate of the fluid, a pair of lead wires connected to said electrodes respectively to transmit said A.-C. output voltage to electrical amplifier means, said pipe forming an electrically-conductive path for establishing an electrical connection between the fluid at opposite ends of said pipe section; and wherein said lead wires form a conductive loop which may be linked by spurious magnetic fields producing corresponding spurious background signals at the input of said amplifier means; said apparatus including the improvement for minimizing said spurious background signals which comprises: a separate additional mass of electrically-conductive material adapted to be physically shifted with respect to the other components of said apparatus for selecting the proper position for said mass of electrically-conductive material and for placing said mass in said selected proper position; said mass of electrically-conductive material being located within the magnetic flux produced by said coil means to develop eddy currents therein responsive to said magnetic flux; fastening means for securing said mass of electrically-conductive material in any selected position within said magnetic flux; said mass of electrically-conductive material producing a compensating magnetic field which links said conductive lead wire loop to counteract said spurious magnetic fields linking said loop and thereby minimize said spurious signals in said lead wires.

6. Apparatus as claimed in claim 5, wherein said mass of electrically-conductive material is assymetrically positioned with respect to the effective plane of said lead wires.

7. Apparatus as claimed in claim 5, including a band of magnetic material surrounding said coil means to provide a low-reluctance magnetic path therefor, said mass of electrically-conductive material being secured to the inner surface of said band of magnetic material.

8. Apparatus as claimed in claim 5, including a sheath of conductive material wrapped around said coil means, and circuit means for maintaining said sheath at the potential of the liquid in said pipe section.

References Cited in the file of this patent

UNITED STATES PATENTS

| | | |
|---|---|---|
| 2,200,263 | Kramolin | May 14, 1940 |
| 2,279,014 | Sawyer | Apr. 7, 1942 |
| 2,579,560 | Ford | Dec. 25, 1951 |
| 2,685,796 | Romanowski et al. | Aug. 10, 1954 |
| 2,696,737 | Mittelmann | Dec. 14, 1954 |
| 2,766,621 | Raynsford et al. | Oct. 16, 1956 |
| 2,771,771 | Kamp et al. | Nov. 27, 1956 |

FOREIGN PATENTS

| | | |
|---|---|---|
| 642,433 | Germany | Mar. 5, 1937 |

OTHER REFERENCES

Article: Electromagnetic Flowmeter for Transient Flow Studies, by Arnold, in Review of Scientific Instruments, vol. 22, No. 1, January 1951, pages 43–46.